(No Model.)
F. BEALL.
STEAMER FOR TEMPERING WHEAT.
No. 510,954. Patented Dec. 19, 1893.
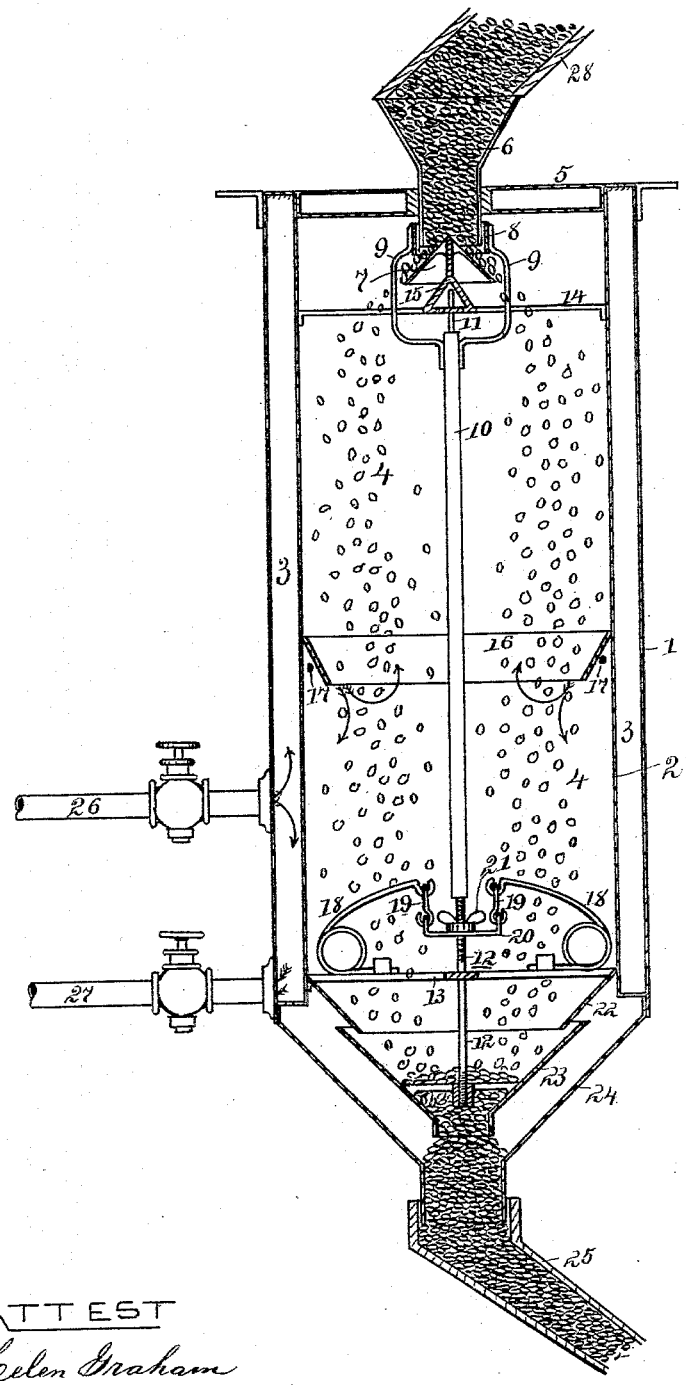
ATTEST
Helen Graham
William Graham
INVENTOR
FRANK BEALL
by his attorney
L. P. Graham

UNITED STATES PATENT OFFICE.

FRANK BEALL, OF DECATUR, ILLINOIS, ASSIGNOR OF ONE-HALF TO HUGH CREA, OF SAME PLACE.

STEAMER FOR TEMPERING WHEAT.

SPECIFICATION forming part of Letters Patent No. 510,954, dated December 19, 1893.

Application filed April 22, 1893. Serial No. 471,405. (No model.)

*To all whom it may concern:*

Be it known that I, FRANK BEALL, of Decatur, in the county of Macon and State of Illinois, have invented certain new and useful Improvements in Steamers for Tempering Wheat, of which the following is a specification.

In the drawing forming part of this specification a device embodying my invention is shown in central vertical section. The outer cylinder is shown at 1, the inner cylinder at 2 and the steam jacket at 3. The tempering chamber is seen at 4, a lid at 5, a funnel-shaped inlet at 6, a stationary cone at 7, a ring valve adapted to seat itself on the cone and normally encircling the lower end of funnel 6 is shown at 8. Rods 9 connect valve 8 with tube 10. The upper end of the tube is provided with a pin 11 which has a bearing in spider 14 and forms a vertical guide for the upper end of the rod and for the valve. Rod 12 is screwed into the lower end of the tube. It has a bearing in spider 13 and it carries the valve-regulating pan 23 on its lower end. It is provided with a strap 20 and a nut 21 to regulate the position of the strap. Springs 18 are secured to the spider at opposite points, and they connect with strap 20 by means of links 19. Flange 16 extends downward from a line slightly above steam-admitting apertures 17 and protects such openings from dust or anything that would tend to clog them. Flange 22 guides the wheat into the valve-controlling pan. The lower end of the tempering chamber is shown at 24, the discharge spout at 25 and the supply spout at 28. The steam supply pipe is shown at 26 and the discharge pipe for the water of condensation is shown at 27. As indicated in the drawing the springs are set to carry the pan and the accumulation of grain therein shown, and hold the valve ring well out of contact with the cone. If the accumulation should increase the pan would descend with the grain and decrease the size of the inlet opening, and vice versa. The inlet and discharge openings are closed by the wheat, as indicated, and the admitted grain falls in a scattered condition rapidly through the compressed steam in the heated chamber.

Having thus described my invention, I claim as new and desire to secure by Letters Patent—

A device for tempering wheat comprising a chamber, a funnel in the upper end of the chamber, a cone below the funnel, a valve-ring loosely encircling the lower end of the funnel, a valve controlling pan in the lower end of the chamber, a rod connecting the valve ring with the pan, and a spring or springs normally sustaining the pan and holding the valve out of contact with the cone, substantially as set forth.

In testimony whereof I sign my name in the presence of two subscribing witnesses.

FRANK BEALL.

Attest:
DAVID HUTCHISON,
H. CREA.